No. 734,426. PATENTED JULY 21, 1903.
H. C. MORRISON & J. T. FLIPPEN.
PLOW.
APPLICATION FILED JUNE 5, 1902.
NO MODEL. 2 SHEETS—SHEET 1.
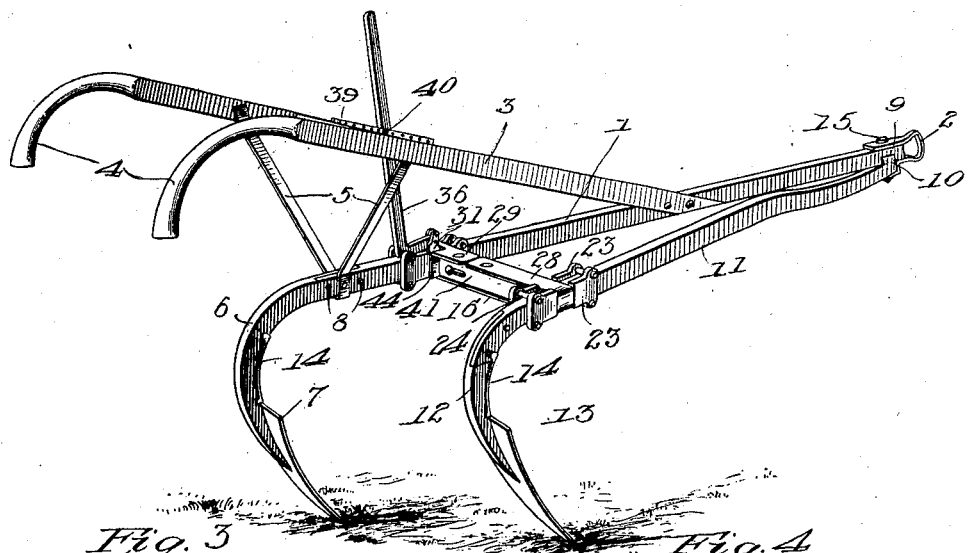
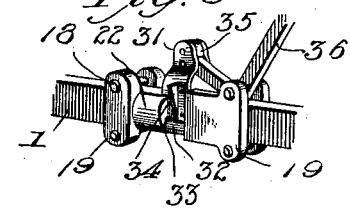
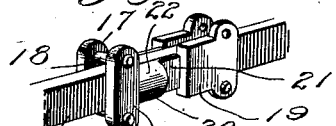
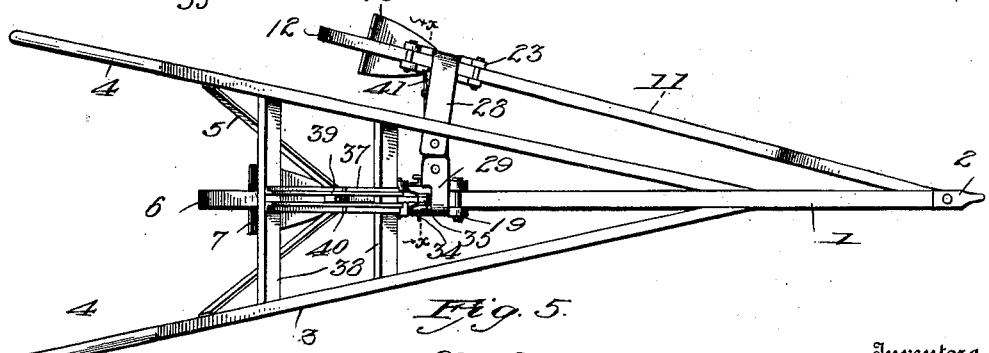
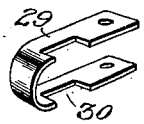
Witnesses
Wm J Koerth
Irving King
Inventors
Henry C. Morrison,
John T. Flippen,
By Victor J. Evans
Attorney No. 734,426. PATENTED JULY 21, 1903.
H. C. MORRISON & J. T. FLIPPEN.
PLOW.
APPLICATION FILED JUNE 5, 1902.
NO MODEL. 2 SHEETS—SHEET 2.
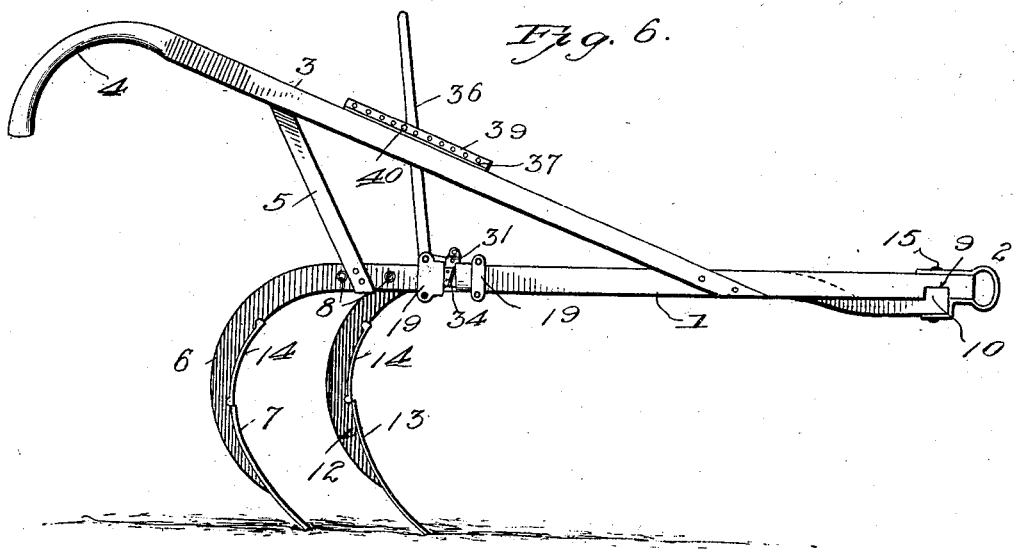
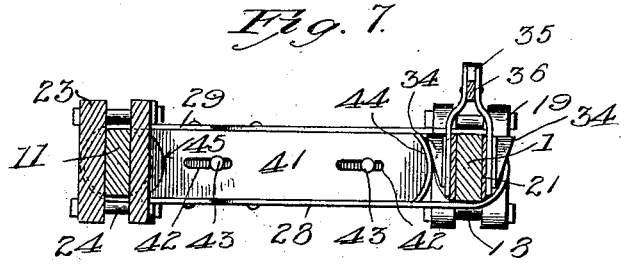
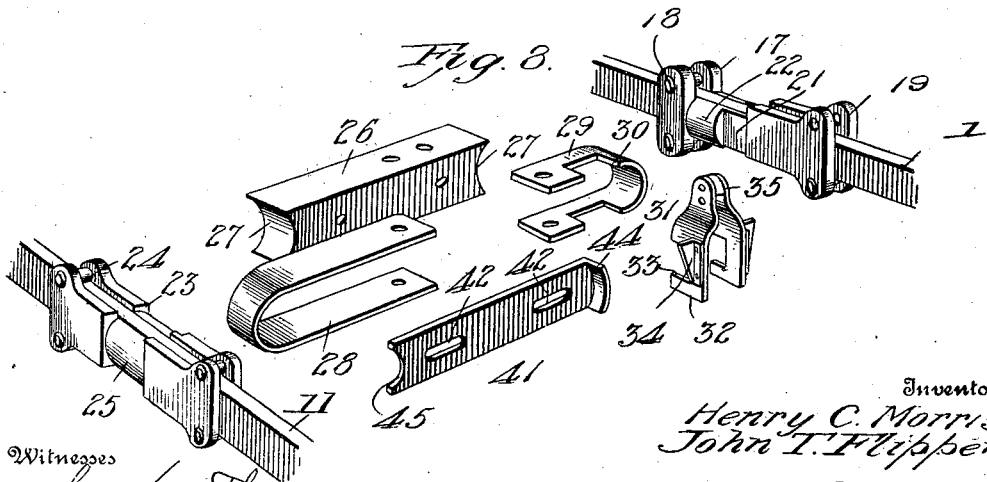
Inventors.
Henry C. Morrison
John T. Flippen,
By Victor J. Evans
Attorney
Witnesses No. 734,426. Patented July 21, 1903.

UNITED STATES PATENT OFFICE.

HENRY CLAY MORRISON, OF SANDY RIVER, AND JOHN T. FLIPPEN, OF GRAYSTONE, VIRGINIA; SAID FLIPPEN ASSIGNOR OF ONE-THIRD OF HIS RIGHT TO SAID MORRISON.

PLOW.

SPECIFICATION forming part of Letters Patent No. 734,426, dated July 21, 1903.

Application filed June 5, 1902. Serial No. 110,355. (No model.)

*To all whom it may concern:*

Be it known that we, HENRY CLAY MORRISON, residing at Sandy River, in the county of Pittsylvania, and JOHN T. FLIPPEN, residing at Graystone, in the county of Henry, State of Virginia, citizens of the United States, have invented new and useful Improvements in Plows, of which the following is a specification.

This invention relates to cultivators or plows; and the purpose of the present improvement is to provide a plow having adjustable features to adapt it for use on sidehills sloping in opposite directions and to render the adjustment positive through the interposition of a connector operating to prevent the adjustable element from having lateral movement after it is disposed on either side of a main beam.

The improved plow also contemplates the provision of a straddle-row cultivating attachment capable of removable application and substitution in lieu of the sidehill adjustable element and the removal of the cultivator of the main beam, and, further, to produce a gang-cultivator by the use of the straddle-row attachment with the cultivator of the main beam.

It is proposed, by means of the attachment set forth, to organize a plow capable of being quickly converted from one form into another and derive the same efficiency in practical result as obtained by the use of a number of independent plow structures, with a material reduction in the expense of manufacture and cost to the user.

In the drawings, Figure 1 is a perspective view showing the improved plow arranged for sidehill use and embodying a movable plow element adapted to be swung over and operatively positioned on opposite sides of the main beam. Fig. 2 is a top plan view of the plow as shown by Fig. 1, with the movable plow element on the side of the main beam opposite that shown by Fig. 1. Fig. 3 is a detail perspective view of a portion of the main beam, particularly showing a locking device and the means for operating the same. Fig. 4 is a detail perspective view of a portion of the beam of the movable plow element, showing the clips for engaging one extremity of the connector. Fig. 5 is a detail perspective view of a part of the connector between the main beam and the beam of the movable plow element. Fig. 6 is a side elevation of the plow shown by Figs. 1 and 2 with the movable plow element on the same side as illustrated by Fig. 2. Fig. 7 is a section on the line $z$ $z$, Fig. 2. Fig. 8 shows detail perspective views of the parts of the connector disassociated and parts of the beam engaged by the connector.

Similar numerals of reference are employed to indicate corresponding parts in the several views.

The numeral 1 designates a main plowbeam, having a suitable clevis 2 attached to the front end thereof. To the beam 1 the front extremities of handle-bars 3 are rigidly secured, and said bars terminate at the rear in suitable downturned grips 4. The bars 3 are also supported in relation to the beam 1 by braces 5, which preferably consist of straps of metal bent into suitable shape for practical application to the beam and bars. The rear end of the beam 1 is longitudinally cut away or mortised to removably receive the front correspondingly-mortised or cut-away end of a downwardly-curved section 6, to which the plow blade or shovel 7 is directly attached, the said section 6 serving both as a support and means of securement of the plow blade or shovel 7 to the beam 1. The engaging ends of the beam 1 and section are held in separable relation by bolts 8, and in one organization of the improved plow the section 6 will be removed, as will be presently explained.

The front end of the beam 1 directly under the top shank of the clevis 2 is formed with a slot 9 to receive an upstanding fulcrum projection 10 on the front extremity of a supplemental or auxiliary beam 11, which also has a section 12 separably attached to the rear end thereof by a joint similar to that described in connection with the beam 1 and section 6. The section 12 has also secured thereto a plow blade or shovel 13, which is similar to the blade or shovel 7; but it is obvious that these blades may be varied at will, and to protect the portions of the front edges of the sections 6 and 12 immediately above the upper edges of the blades or shovels 7 and 13 wear-guards 14 are secured over said edges, and as the soil rolls up over the blades or shovels it strikes the said guards and relieves the adjacent edges of the sections 6 and 12 from direct abrading wear. The fulcrum projection 10 on the front extremity or end of the supplemental or auxiliary beam 11 is of such dimensions relatively to the slot 9 that it will freely turn in the latter, and extending vertically through the front extremity of the beam 1, the said fulcrum projection 10, and the upper and lower shanks of the clevis 2 is a pivot-bolt 15. Through the medium of the fulcrum projection and the pivot-bolt just described the supplemental or auxiliary beam 11 is adapted to be swung under the beam 1 to either side of the latter to adapt the plow for use on sidehills sloping in opposite directions, and it is obvious that some means should be provided for holding the supplemental or auxiliary beam 11 in positive adjusted position on either side of the beam 1, and for this purpose a connector 16 is employed and terminally engages the beams 1 and 11.

As clearly shown in detail in Figs. 3 and 4, the beam 1 has clip-plates 17 secured thereto by bolts 18, extending through the terminals thereof above and below the upper and lower edges of the said beam 1. These plates are of duplicate construction, and a description of one will suffice for both, and each comprises opposite enlarged terminals 19, shaped and projected to render them practical as a means of receiving the bolts 18 for the purpose of securement, as heretofore set forth. These terminals 19 are connected by an intermediate longitudinally-extending bar 20 with a vertical slot 21 cut therethrough, the major portion of the bar having a convex face 22. When both plates are applied to the beam 1, the similarly-shaped terminals or terminal members are transversely alined, as well as the slots 21 and the convex portions 22 of the bars 20. The beam 11 is also provided with clip-plates 23, having front and rear enlarged terminal members to receive securing-bolts 24 for attaching the said plates 23 to the beam 1. Each of the plates 23 also has an intermediate longitudinally-extending bar 25, which is reduced and formed with a convex face. The said plates 23, when applied in operative relation, having the bars directly opposite each other to practically form a rounded surface on opposite sides of the beam. The bars 19 and 25 are engaged by the opposite terminals of the connector 16, and the latter comprises an intermediate substantially rectangular member 26, having concave seats 27 formed in the opposite ends to bear against the convex faces or portions of the bars 19 and 25. The convex faces or portions of the clip plates or bars forming a part of the latter are applied to the opposing sides of the beams 1 and 11, and in order to removably connect the one extremity of the member 26 to the beam 11 an elongated U-shaped connecting-strap 28 is provided and secured to the upper and lower sides of the said member 26 after it has been passed over the clip-plate on the beam 11 and has its bowed portion always held in engagement with the convex surface of the intermediate bar of the said outer clip-plate. It will be understood that when the connector is swung over the bowed portion of the connecting-strap will then engage the convex bar of the inner clip-plate, as positioned in Fig. 1. On the opposite end of the member 26 a shorter U-shaped connecting-strap 29 is bolted and has its upper and lower members formed with rectangular slots 30, opening out of the rear edges thereof and in vertical alinement. This connecting-strap 29 serves to movably attach the member 26 to the clip-plates 17 on the beam 1 and engages the bars of the said plates. The purpose of the slots 30 is to clear the vertical slots 21 in the bars of the clip-plates 17, and vertically movable in the slots 21 and 30 is a locking-slide 31, having depending legs 32, with forwardly-opening slots 33 and laterally-projecting wedge-shaped projections 34. The legs 32 converge to an upper head 35, and extending between the upper portions of the legs and pivoted thereto directly under the head is the lower shorter member of a bell-crank lever or operating-lever 36, which is pivotally connected at its angle to the upper bolt 18, passing through the rear terminal members 19 of the plates 17. The longer member of the lever 36 projects upwardly through guides 37, secured to the cross-braces 38 for the handle-bars 3, and projecting upwardly from the said guides are perforated plates 39 to removably receive a holding-pin 40. When the longer member of the lever 36 is adjusted and moved either forwardly or backwardly, it may be retained in any position desired by the use of a pin 40, which may be brought to bear against either the rear or forward edge thereof. The function of the slots 33 in the slide 31 is to permit the bowed portion of the strap 29 to move through said slots in the swinging movement of the entire connector, or, in other words, to avoid obstruction of the free movement of the said connecting-strap in changing the adjustment or the position of the connector 16.

The connector 16 also includes in its organization a clamping-slide 41, having longitudinally-disposed slots 42 therein near opposite extremities, through which bolts 43 are passed into the one side of the member 26. At one end the clamping-slide 41 has a convex angular flange 44, and the opposite end is formed with a concave recess 45 to operate against the flat surfaces of the bars 25, forming part of the clip-plates 23. The convex flange 44 is disposed in operative relation with the wedge-shaped projections 34 of the locking-slide 31, and it is obvious that as the said locking-slide is depressed either of the wedge-shaped projections to which the flanges 44 may be adjacent and in contact will cause the clamping-slide 41 to be shifted toward the beam 11 and longitudinally of the member 26 and effect a tight binding between the concave recess 45 and either one of the flat faces of the bars 25 of the clip-plates 23 in accordance with the position of the beam 11 on one side or the other of the main beam 1. By setting up this binding action the beam 1 will be prevented from having loose movement, and the degree of tightness effected will depend upon the downward depression of the locking-slide 31 in view of the wedge-shaped projections 34.

The beam 11 and the connector 16 can be readily detached or applied by removing the bolts or connecting devices for the straps 28 and 29, it being understood that the bolts for connecting said straps will be suitably nutted for convenience in this detachment and assemblage of the connector and beam 11. Likewise the bolt 15 may be supplied with a nut, so as to render it easily removable and applicable in making the changes or substitution of the different parts referred to.

The improved combined plow organization will be found exceptionally convenient in its operation, and in converting the same from one condition to another very little labor and time will be required. Furthermore, by embodying in one organization a number of parts or attachments whereby different forms of plows or cultivators may be derived a material saving in expense to the user results. The provision of a plow having means whereby sidehill slopes in different directions may be accommodated is also exceptionally advantageous.

A further advantage in the present construction is that the blades or shovels of the plow may be adjusted to increase or decrease their transverse distance of separation. This is accomplished by loosening the clip-bolts and adjusting the clip-plates longitudinally of the beams and afterward tightening said bolts.

Having thus fully described the invention, what is claimed as new is—

1. In a plow, the combination of a main beam, a supplemental beam pivotally connected thereto to swing thereunder and occupy a position on opposite sides of said main beam, a connector having the opposite extremities movably engaging the said beams, a clamping-slide having a convex flange at one end, and a vertically-movable locking-slide having opposite wedge-shaped projections to engage the said flange of the clamping-slide.

2. A plow comprising a main beam, a supplemental beam pivotally attached thereto, a connector having terminal devices surrounding and movable on portions of the beams, a clamping-slide carried by the connector, a vertically-movable locking-slide having projections to engage a portion of the clamping-slide, and an operating-lever movably attached to the locking-slide.

3. A plow comprising a main beam, a supplemental beam pivotally attached thereto, clip-plates secured to the said beams and having opposite bars with convex faces, a connector having terminal projecting straps to movably surround and bear against said clip-plates, the said straps being rotatable on the clip-plates and connected to each beam, and locking means for the said connectors.

4. A plow comprising a main beam, a supplemental beam pivotally attached thereto, clip-plates secured to the said beams and having bars with convex faces, a connector having terminal projecting straps to movably surround and bear upon the clip-plates, the said straps being rotatable on the plates, a clamping-slide movable longitudinal on the conductor, a vertically-movable locking-slide having projections to engage a portion of the clamping-slide, and means for operating the said locking-slide.

5. A plow comprising a main beam, a supplemental beam pivotally attached thereto, clip-plates secured to the said beams and having bars at opposite sides thereof formed with convex faces and vertically-extending recesses, a connector having terminals rotatably embracing the said clip-plates, a clamping element longitudinally mounted on the connector, and a vertically-movable locking-slide having projections at opposite sides to engage a portion of the clamping element.

In testimony whereof we affix our signatures in presence of two witnesses.

HENRY CLAY MORRISON.
JOHN T. FLIPPEN.

Witnesses:
W. W. WADDILL,
WALTER C. NOELL.